(12) United States Patent
Gerets et al.

(10) Patent No.: US 9,470,400 B2
(45) Date of Patent: Oct. 18, 2016

(54) ROTATING WAVELENGTH CONVERSION ELEMENT

(75) Inventors: Peter Gerets, Roeselare (BE); Olivier Charlier, Brussels (BE); Dirk Maes, Wevelgem (BE)

(73) Assignee: Barco N.V., Kortrijk (BE)

( * ) Notice: Subject to any disclaimer, the term of this patent is extended or adjusted under 35 U.S.C. 154(b) by 168 days.

(21) Appl. No.: 14/232,047

(22) PCT Filed: Jul. 13, 2012

(86) PCT No.: PCT/EP2012/063793
§ 371 (c)(1),
(2), (4) Date: Jan. 10, 2014

(87) PCT Pub. No.: WO2013/007818
PCT Pub. Date: Jan. 17, 2013

(65) Prior Publication Data
US 2014/0140038 A1 May 22, 2014

(30) Foreign Application Priority Data
Jul. 14, 2011 (GB) .................................. 1112048.2

(51) Int. Cl.
*F21V 14/08* (2006.01)
*G03B 21/16* (2006.01)
*G03B 21/20* (2006.01)
(Continued)

(52) U.S. Cl.
CPC ................. *F21V 14/08* (2013.01); *F21V 9/16* (2013.01); *F21V 13/08* (2013.01); *F21V 29/30* (2013.01); *G03B 21/16* (2013.01); *G03B 21/204* (2013.01); *G03B 21/208* (2013.01);
(Continued)

(58) Field of Classification Search
CPC ........ F21V 9/16; F21V 14/006; F21V 14/02; F21V 14/08; G03B 21/204
USPC .................................. 362/293, 84, 231, 269
See application file for complete search history.

(56) References Cited

U.S. PATENT DOCUMENTS

2005/0219471 A1   10/2005   Kitabayashi
2007/0019408 A1   1/2007    McGuire, Jr. et al.
(Continued)

FOREIGN PATENT DOCUMENTS

CN    101828139 A    9/2010
CN    101836160 A    9/2010
(Continued)

OTHER PUBLICATIONS

Chinese Office Action for corresponding Chinese patent application No. 201280034456.9 dated Jul. 29, 2015 (English translation included).
(Continued)

*Primary Examiner* — Ali Alavi
(74) *Attorney, Agent, or Firm* — Renner, Otto, Boisselle and Sklar LLP

(57) ABSTRACT

A method and apparatus is described for producing high brightness, e.g. multicolor light, whereby a region of a wavelength conversion element and a light source producing excitation light are moved relative to each other so that said region is exposed to the excitation light at different times and in a progressive movement that scans across a part of the entire surface of the wavelength conversion element. The wavelength conversion element can be cooled by air or with a liquid.

16 Claims, 11 Drawing Sheets

(51) Int. Cl.
*H04N 9/31* (2006.01)
*F21V 9/16* (2006.01)
*F21V 13/08* (2006.01)
*F21V 29/00* (2015.01)

(52) U.S. Cl.
CPC ......... *H04N 9/3114* (2013.01); *H04N 9/3144* (2013.01); *H04N 9/3158* (2013.01)

(56) References Cited

U.S. PATENT DOCUMENTS

| | | | |
|---|---|---|---|
| 2007/0146639 A1 | 6/2007 | Conner | |
| 2009/0284148 A1* | 11/2009 | Iwanaga | G02B 26/008 313/506 |
| 2010/0208486 A1* | 8/2010 | Gladnick | G01B 11/026 362/551 |
| 2010/0328617 A1* | 12/2010 | Masuda | G03B 21/14 353/31 |
| 2010/0328628 A1* | 12/2010 | Masuda | G02B 26/008 353/85 |

FOREIGN PATENT DOCUMENTS

| | | |
|---|---|---|
| JP | 2010-85740 A | 4/2010 |
| JP | 2010085740 | 4/2010 |
| JP | 2011133784 | 7/2011 |
| WO | 2009/017992 A1 | 2/2009 |

OTHER PUBLICATIONS

Chinese Office Action for corresponding Chinese patent Application No. 201280034456.9 dated Feb. 9, 2015. (Includes English Translation).

\* cited by examiner

ROTATING WAVELENGTH CONVERSION ELEMENT

CROSS-REFERENCE TO RELATED APPLICATIONS

This application is a §371 national stage entry of International Application No. PCT/EP2012/063793, filed Jul. 13, 2012, which claims priority to Great Britain Patent Application No. 1112048.2 filed Jul. 14, 2011, the entire contents of which are incorporated herein by reference.

FIELD OF THE INVENTION

The present invention relates to an illumination device and method for providing high brightness multicolor light as well as to a projection device including the illumination device.

BACKGROUND OF THE INVENTION

For the illumination of digital projection systems, solid state lighting could be a preferred method. Typically a light source is combined with an imaging system which yields the actual image. The brightness of the projection system is mainly depending on the power and the nature of the light source. Up to now lamps have been used more or less exclusively. For low brightness systems, UHP lamps are used, for high brightness systems, Xenon lamps are used. Lamps are expensive and often do not last long enough. However conversion to solid state lighting still remains a challenge.

LED illumination technology has been used successfully for low brightness systems. Typically LED illumination replaces the UHP lamps for low brightness systems up to 1.500 lumens. Laser illumination technology is currently engaged in development for replacement of Xenon lamps in the high brightness systems above 10 k lumens.

In between the brightnesses where LED illumination stops and Laser illumination starts, there is an opportunity for a lightsource which is scaleable within that range.

Diode lasers have been used in several applications and red and blue diode-lasers are known. Blue lasers have been developed for application in Blue Ray disk systems and are now marketed in compact packages, high power output (e.g. Nichia TO9 package) and low cost. Blue light has a wavelength which is suitable for pumping electroluminescent phosphors, e.g. the phosphors often used in LED's for general lighting applications. These phosphors are commonly available, with the one phosphor being more efficient than the other. Combining the blue lasers with light emitting phosphors is called laser-phosphor conversion or phosphor pumping.

This process is already used in several projection applications, but only at lower brightness levels.

A limitation still lies in the heat dissipation of the phosphors. A phosphor layer emits light rather in a lambertian way, which makes the light difficult to be captured and collimated. Hence the blue pump energy is projected on the phosphor in the most compact way, usually a very small spot, which increases the efficiency of capturing the light in the downstream optical system, but also increases the energy density in the phosphor layer. In this small spot, high energy dissipation will saturate the phosphor at a certain level, with brightness clipping and phosphor layer damage as a result.

In order to avoid this, the spot can be made larger, or the cooling can be made more efficient. Typically, in these applications, the phosphor material is mounted on a disk, which is composed of glass, to allow pumping from the back, or which is composed out of a metal which requires pumping from the front, but provides a better basis for transporting the dissipated heath through the color wheel's metal base. Due to the rotation of the wheel in free air, the wheel surface itself and the phosphor layer are cooled by air. Wavelength conversion methods that use excitation light produced by solid-state light source such as laser diodes (LDs) or light emitting diodes (LEDs) and wavelength conversion materials such as phosphors or quantum dots can produce high brightness light at wavelengths different from the wavelength of the excitation light. For high power white LED devices, often conversion from blue to white light is accomplished by phosphor wavelength conversion. To produce high brightness illumination in a projection device, red, green and blue solid state light sources, such as high power LEDs and lasers, offer improved lifetime over arc lamps. Lasers offer higher brightness then LEDs. When using lasers to produce high brightness illumination, a red laser is available in the art, for instance diode bars. A diode laser can also be used to produce the blue light, but disadvantageously a high power green diode laser is still way out in the future. Hence the possibility to convert blue to green light using a blue diode laser and green phosphors is quite attractive, even if this results in some conversion losses.

US20090284148 describes a projector using this principle in its illumination path. A blue light is generated by using a blue high power diode laser (for instance a Nichia™ diode laser) which is converted through a green light producing phosphor which is deposited on a rotating color wheel. The color wheel also takes care of the color sequencing needed for the single light valve illumination in the system. However, the output power of the illumination system is limited due to the power density of the excitation light projected on the phosphors. The longer the phosphor is exposed to the high density laser light, the faster the phosphor will burn-in. Conversion losses result in local heating of the phosphor, which in turn reduces its efficiency and can cause a shift in its emission spectrum. Rotation of the color wheel will distribute the power density over the color wheel area corresponding with the spot of the excitation laser falling on the color wheel over the track covered by the spot over the rotating phosphor surface.

WO2009017992 discloses a similar illumination device wherein the high power laser spot is illuminating while a color wheel is rotationally moving and as a result the phosphors comprised in that illuminated circular path are repeatedly heated.

SUMMARY OF THE INVENTION

An object of the present invention is to provide an alternative illumination device and method for providing high brightness colored or multicolored light. In particular an object of the invention is to provide an illumination device and method that suffers less from long term and/or short term degradation of color point. In particular thermal degradation of materials, especially wavelength conversion materials can be reduced so that both long term and/or short term degradation of color point can be avoided or reduced.

The present invention provides an illumination device comprising a light source for generating an excitation light and a wavelength conversion element, said wavelength conversion element comprising: a region containing a wavelength conversion material capable of absorbing the excitation light of said light source and emitting light having wavelengths different from that of the excitation light; and wherein the wavelength conversion element and the excitation light source are moveable relative to each other so that said region is exposed to the excitation light at different times and in a progressive relative movement that scans across a two-dimensional surface of the wavelength conversion element.

The light of the light source will form a spot on the wavelength conversion element and the spot moves across the element in at least two non-collinear directions in the plane of the wavelength conversion element (e.g. either by combination of two rotations or rotation and translation).

This device has the advantage that both long term and/or short term degradation of color point as well lifetime of the wavelength conversion material can be improved. In accordance with an aspect of the present invention, degradation of the properties of the wavelength conversion material can be postponed by regularly shifting the position of the region upon which the excitation light impinges. The technical problem of degradation of the wavelength conversion element such as phosphor by suitable movements such as a rotational movement including an orbiting movement according to an embodiment of the present invention.

The present invention includes within its scope that different excitation light sources, e.g. different colored light sources are used with one wavelength conversion element such as one color wheel, e.g. in a single-chip projector.

The present invention also includes within its scope to have separate wavelength conversion elements, e.g. color wheels, each with an excitation light source to deliver different primary colors in, for example a three-chip projector.

The present invention also includes within its scope to have less different excitation light sources than different wavelength conversion materials. In this case for example a color such as red is generated from a green or yellow diode laser using a wavelength conversion material in addition to green when generating RGB primary colors.

In some embodiments the wavelength conversion element is used in transmission, and a dichroic element can be disposed between the wavelength conversion material and the light source, the dichroic element transmitting the excitation light and reflecting light emitted by the wavelength conversion material.

In other embodiments, the wavelength conversion element can be used in reflection, A reflecting material preferably is disposed in the back of the wavelength conversion material. The reflecting material preferably will return unconverted excitation light as well as light emitted by the wavelength conversion material. For example, the reflecting material can be a polished metal.

The region containing a wavelength conversion material can cover at least part of the width or the full width of the wavelength conversion element, whereby this width is measured in a direction away from the axis of incidence of the excitation beam.

The relative movement of the wavelength conversion element and the excitation light source is preferably achieved by combining rotational and/or translational movements such that a region of the wavelength conversion element is scanned by light from the excitation light source. For example, two actuators can be used to generate the relative movement between said wavelength conversion element and the excitation light beam; a first actuator is used to rotate said wavelength conversion element relative to the excitation light beam and a second actuator is used to translate said wavelength conversion element relative to the excitation light beam in a direction with a component parallel to the plane of said wavelength conversion element.

The frequency of a translational movement is preferably smaller than the frequency of a rotational movement resulting in a spiraling pattern. This spiral pattern results in new photoluminescent material being irradiated by the excitation light beam on each rotation.

The wavelength conversion element preferably comprises a material that photoluminesces to produce at least one primary colored light when illuminated with said light from said light source. Different light sources can be used for enabling different primary colors. For example, the light source can be a solid-state light source such as a laser diode or a light emitting diode or an OLED. The power of the solid-state light source can be modulated to compensate the differential aging of said wavelength conversion element. Alternatively or additionally the power of the solid-state light source can be modulated to compensate for short term fluctuations and keep the light output constant at a desired level.

To improve the lifetime of the wavelength conversion element, it is preferred that when material that photoluminesces is degraded after illumination by said light from said excitation light source, the excitation beam is moved to a fresh region, different from the materials that photoluminesce which are degraded after illumination, comprising materials which photoluminesce which have not been illuminated. For example, a reserve of unused wavelength conversion material can be provided.

To reduce temperatures of the wavelength conversion material, a local cooling device can be attached in the vicinity of the wavelength conversion element. The local cooling device can be a nozzle which blows cool air.

The wavelength conversion element can be made in any suitable shape, e.g. it can comprise discrete sectors of wavelength conversion material, said sectors either comprising substantially the same composition or different wavelength conversion compositions or a substantially optically reflecting or transparent material for said light source.

The present invention includes within its scope switching between the different regions or sectors at regular time intervals that are much shorter then the lifetime of the wavelength conversion materials to enable less deterioration of the wavelength conversion materials of the different regions or sectors.

To make efficient use of material, the amplitude of a translational movement is preferably substantially as large as the width of said region containing said wavelength conversion material. However, non-uniform or damaged edges of the region are preferably avoided such that the actual effective area to use is a bit smaller. Alternatively the amplitude of the translational movement can be a fraction of half of the width of said region containing said wavelength conversion material.

Other optical devices can be placed in the optical path. For example, a light valve can be provided whose operation is synchronized with the rotating movement of the wavelength conversion element such that colors are displayed sequentially. For example, a light guide or rod integrator, or a fly-eye integrator can be included in the optical path.

For ease of manufacture the wavelength conversion element can be a color wheel.

A sensor such as an intensity sensor can be used for determining the end of the lifetime of the wavelength conversion element. Any of the above can be combined with a closed loop feedback system to maintain white point and constant light output.

The present invention also provides a projecting device including the illumination device according to any of the embodiments of the present invention.

The present invention also provides a method for producing high brightness, e.g. multicolor light, whereby a region of a wavelength conversion element and a light source producing excitation light are moved relative to each other so that said region is exposed to the excitation light at different times and in a progressive movement that scans across a part of the entire surface of the wavelength conversion element.

An advantage of embodiments of the present invention is a reduction in the average power density distribution of the excitation beam such as generated by a solid state light source, e.g. high density laser light, LED light, OLED light, by moving the surface of a wavelength conversion material such as a photoluminescence material such as materials which encompass both fluorescence and phosphorescence material of which phosphor and quantum dot are only two examples relative to the laser beam in 2 dimensions.

The wavelength conversion material can cover at least part of the width or the full width of the wavelength conversion element that is perpendicular to the axis of incidence of the excitation beam. In other embodiments, the wavelength conversion material may be provided as discrete sectors on the wheel corresponding to the different primary colors or may be a ring of material around all of the wheel.

This orbiting movement of the wavelength conversion material surface, such as the fluorescent or phosphorescent material of which phosphor and quantum dot are only two examples, on a rotating wheel combined with a relative translational movement, will produce a spot of an excitation beam that can travel over a part or the total available surface of the wavelength conversion material such as a fluorescent or phosphorescent material of which phosphor and quantum dot are only two examples, hence decreasing the burn-in and increasing the lifetime of the laser-wavelength conversion material combination. The orbiting over a 2D area can be done by a translational movement combined with a rotational movement performed at the same time, e.g. by rotating a color wheel assembly while moving the excitation beam relative to the wheel such as by moving the beam or the rotating wheel in a translational manner, e.g. in an oscillating translational manner. Other movements are included within the scope of the invention, e.g. two movements which are orthogonal to each other or at any suitable angle. Hence the two movements can both be translational movements in two orthogonal directions applied simultaneously. Both movements can also be rotating motions such as a main rotation of a wavelength conversion element such as a color wheel about a central axis and a rotational processing of the axis of rotation to produce cycloidal, such as trochoidal, hypocycloidal, epicycloidal, hypotrochoidal, epitrochoidal motions. In accordance with embodiments of the present invention and depending on the power density and the characteristics of the wavelength conversion material, the rotational and orbiting movement can be modulated to maximize the lifetime of the elements of wavelength conversion material. Both movements can be modulated if the laser-wavelength conversion material combination is a single color light source used for f.i. multiple light valve systems. For single light valve systems, the orbiting itself can be modulated while the rotation is determined by the frequency of the incoming video signal.

In accordance with an embodiment of the present invention the wavelength conversion element can be immersed in a liquid. A circulating means or pump can be provided for circulating or pumping the liquid to cool the wavelength conversion element. The wavelength conversion element or wheel can have fins for rotation by the pumped liquid, e.g. like a Peltier wheel. Gears can be provided for converting the rotation of the wavelength conversion element into relative motion between the excitation light source and the wavelength conversion element so that said region is exposed to the excitation light at different times and in a progressive relative movement that scans across a two-dimensional surface of the wavelength conversion element.

Embodiments of the present invention also provide an illumination device comprising a light source for generating an excitation light and a wavelength conversion element, said wavelength conversion element comprising: a region containing a wavelength conversion material capable of absorbing the excitation light of said light source and emitting light having wavelengths different from that of the excitation light. The wavelength conversion element is immersed in and cooled by a liquid. An enclosure can be provided to hold the liquid and the wavelength conversion element as well as other items such as gears, lenses nozzles etc. Also in this embodiment the wavelength conversion element and the excitation light source can be moveable relative to each other so that said region is exposed to the excitation light at different times and in a progressive relative movement that scans across a two-dimensional surface of the wavelength conversion element.

BRIEF DESCRIPTION OF THE DRAWINGS

Further features of the present invention will become apparent from the drawings, wherein:

FIG. 7 shows the full assembly from the right side. FIG. 8 shows the full assembly from the left side. FIG. 9 shows a phosphor wheel, input lens, output lens, orbiting gear, and in/out liquid pump nozzles according to an embodiment of the present invention. FIG. 10 shows a detail of a phosphor wheel and propeller fins and orbiting gear. FIG. 11 shows a detail of the liquid enclosure. FIG. 12 shows a detail of the orbiting gear according to an embodiment of the present invention. Corresponding reference characters indicate corresponding parts throughout the several views. The exemplification set out herein illustrates exemplary embodiments of the invention, in one form, and such exemplification is not to be construed as limiting the scope of the invention in any manner.

DEFINITIONS

Figure 1:
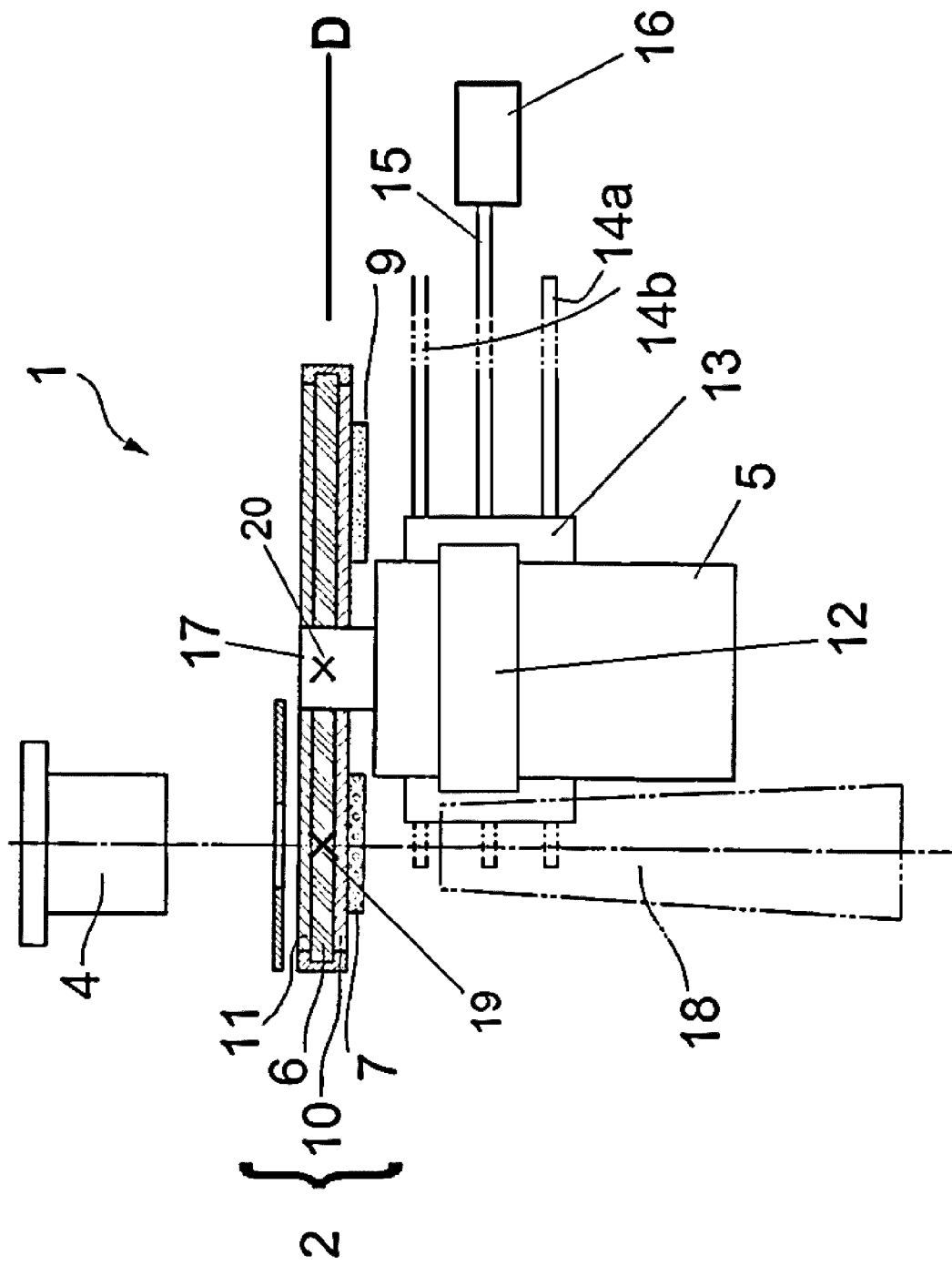
FIG. 1 shows a light source unit comprising a fluorescent wheel according to an embodiment of the present invention.

The term "wavelength conversion material" as used herein relates to photoluminescence materials. The term "photoluminescence" as used herein relates to materials which encompass both fluorescence and/or phosphorescence materials, for instance phosphors and quantum dots are within the scope of this definition. The term "phosphor" as used herein relates to any material which is able to emit light by fluorescence, phosphorescence or more generally by photoluminescence. Thus in the following reference to photoluminescent wheel includes individual and separate reference to phosphorescent or fluorescent wheel just as reference to photoluminescent material includes individual and separate reference to phosphorescent or fluorescent material.

Reference to a "region" of photoluminescent material refers to an area which comprises such material area covered by such a material.

DETAILED DESCRIPTION OF PREFERRED EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

The term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

In the drawings, like reference numerals indicate like features; and, a reference numeral appearing in more than one figure refers to the same element. The drawings and the following detailed descriptions show an illumination device whereby the power density distribution of the high density laser light is spread as a result of moving the laser light across the color wheel over a part or all of its surface but the present invention is not limited to rotation nor to phosphor.

A light source unit 1, according to an embodiment of the present invention illustrated in FIG. 1, can comprise a photoluminescent wheel 2, which can emit light towards other optical components such as a light integrating unit 18 (e.g. a light guide or rod made of an optical material, or a fly-eye integrator) by receiving excitation light from an excitation light source 4, and wherein a photoluminescent wheel 2 is rotated by a first actuator, for instance a wheel motor 5, which is attached to a central portion of a disk-shaped transparent base material 6. The light coming out of the integrating unit can be used to illuminate a light valve, such a DLP™ chip, LCOS or a Liquid Crystal Panel. In implementations with a single light valve, preferably the image generation by the light valve is synchronized with the motion of the color wheel so that one color component such as a green component is displayed on a light valve, when the green section of the color wheel is in front of the incoming light. The same is true for the red, blue and other primary colors. The colors are thus displayed sequentially at a sufficiently high rate that the observer sees a composite "full color" image. In some embodiments a layer comprising a phosphor layer can be deposited over the entire disk and multiple light sources are combined to create a full color image.

The light sources may be solid state light sources such as LED's, OLED's or laser diodes.

In embodiments of the present invention the phosphor layer preferably comprises rare earth materials more specifically, for instance to enable green light, dopant rare earth materials such as $Eu^{2+}$ or $Ce^{3+}$ can be used. The rear earth materials preferably are fastened using a suitable epoxy type binder material. However because epoxy type binder materials are used, delamination due to high temperatures may be another concern. Advantageously, the present invention provides a device and method to manage these temperatures resulting in a better fasting of the rare earth materials.

In some embodiments, the photoluminescent wheel 2 can comprise a central portion of a disk-shaped transparent base material 6 for instance fused silica glass, and a phosphor layer 7. The phosphor layer 7 is optionally disposed on a dichroic layer 10. The dichroic layer 10 can comprise a dichroic coating from any of various suppliers, such as for instance from Oerlikon.

As will be discussed further in other embodiments the wheel 2 may comprise sectors with different phosphor layers (e.g. layers 7 and 9). The dichroic layer 10, which transmits the excitation light emitted by excitation light source 4 but reflects light of other wavelength bands, can be formed through depositing a coating on a surface of the transparent base material 6 which lies on the side where the phosphor layers 7 (and 9) are disposed. An antireflection coating layer 11 preferably may be formed through deposition of a coating on a surface of the transparent base material 6 which lies on an opposite side to the side where the phosphor layers 7 are disposed. In addition, the shaft 17 of motor 5 may extend through a central portion of the photoluminescent wheel 2. The two can be fastened together in any practical way known in the art.

In some embodiments, the angular position of the wheel 2 relative to the shaft 17 may be determined based on the readings of an optical sensor that detects a reference position on the disk-shaped transparent base material 6.

Figure 2:
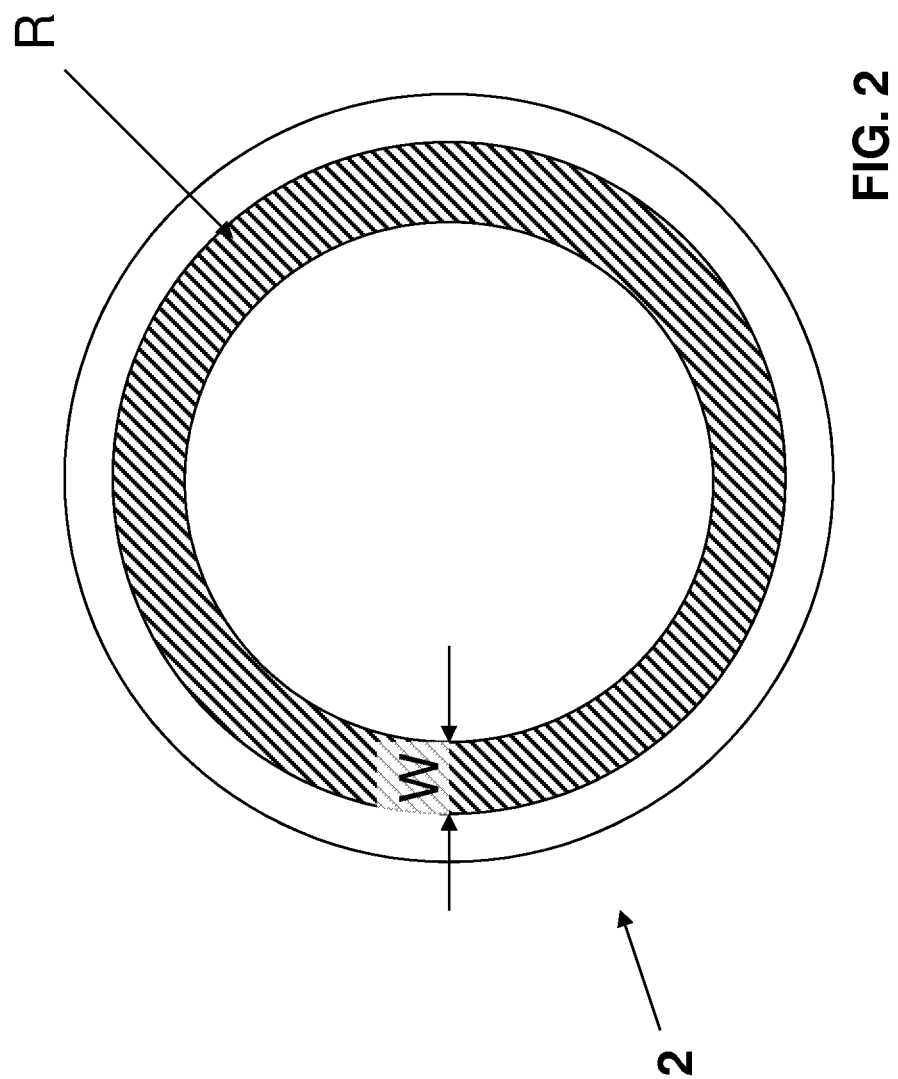
FIG. 2 illustrates where the light impinges on a fluorescent wheel as seen within the plane of a wheel according to an embodiment of the present invention.

While the photoluminescent wheel 2 rotates, the excitation light impinges on different points on the fluorescent wheel 2. The locus of these points as seen within the plane of the wheel 2 is a ring whose width is determined by the dimension of the spot of light created by the excitation light (see dashed region of FIG. 2).

The rotation of the fluorescent wheel will limit the maximum temperature reached by the phosphor through absorption of excitation light. This will postpone deterioration of the phosphor material. Nevertheless, the same ring is repeatedly and constantly being irradiated by the excitation light, which at high(er) intensity will inexorably lead to a deterioration of the phosphor material. By degradation is meant both a reversible shift of the phosphor material properties with temperature and irreversible changes in these properties (for instance, the wavelength emitted by the phosphor material may shift and/or the efficiency with which a desired wavelength is emitted when the phosphor is excited by the excitation light may drop). To further postpone a loss in performance through degradation/deterioration of the phosphor material, one may e.g. increase the radius of the fluorescent wheel 2. By keeping the ring region where the excitation light strikes the wheel close to the border of the wheel, the total time that an element of the region is submitted to the action of the excitation light will decrease (in other words one has increased the total area of phosphor material that will be excited by the excitation light and will receive a given amount of energy over a given length of time). This may not be practical for reasons like compactness (limited space available for the wheel and driving motor) or reliability (stress in the disk will increase with increasing radius).

In other embodiments, the size of the spot describing the ring can be increased by for instance using a lens between an excitation light and fluorescent wheel in order to spread the light over a greater area and by so doing decreasing the power absorbed per unit area of phosphor material struck by the excitation light. However in a projection system the étendue can be limited by the size of the light valve and optical components, and the étendue of the light source has to be smaller in order to effectively use the light emitted from the phosphor. And since the emission angle of the phosphor is 180 degrees, the area has to be quite small.

Some embodiments of the present invention can spread the energy absorbed over the lifetime of the wheel by the phosphor material over a larger locus of points on the fluorescent wheel 2 (and in particular on the phosphor 7) struck by excitation light by adding a further movement such as a lateral movement or additional rotational movement of the fluorescent wheel. The translational movement can be executed in a plane parallel to the plane of the wheel.

In the examples of embodiments discussed below, the direction D of the translation is parallel to the line joining the center of the photoluminescent e.g. fluorescent or phosphorescent wheel 2 and the center of the region of the wheel where the excitation light strikes the wheel (e.g. the points 19 and 20 on FIG. 1).

A second actuator 16 can be used to translationally move the photoluminescent e.g. fluorescent or phosphorescent wheel 2 in a direction parallel to the plane of the wheel (e.g. as represented on FIG. 1 along direction D).

The second actuator may e.g. comprise a second electrical motor rotating a lead screw (or translation screw) 15 parallel to the direction 0, a lead nut fastened to the wheel support (12, 13) will be driven along the threads of the lead screw. The lead nut being fastened to the photoluminescent e.g. fluorescent or phosphorescent wheel support, any displacement of the lead nut will be accompanied by a displacement of the wheel support and the fluorescent wheel parallel to the lead screw. The wheel support (12, 13) is guided by linear guides/shaft (14a, 14b). Instead of a motor, lead screw and lead nut; the translation movement may be enabled by an integrated linear actuator, more specifically a linear actuator made by LINAK™.

In some embodiments, the second actuator may also comprise a crank shaft and/or rod system. The rotary motion of the second electrical motor is converted into a translation motion according to well known principles. In that case element 15 is replaced by a rod linked to a crankshaft or wheel (not shown) through a connecting rod (not shown). The crank shaft or wheel can then be driven by an electrical motor.

The motions imparted to the fluorescent wheel by the first and second actuators may be combined in different ways. For example a photoluminescent e.g. fluorescent or phosphorescent wheel can be used in transmission where the excitation light passes through a base material 6. In other embodiments the photoluminescent e.g. fluorescent or phosphorescent material is deposited on a reflecting wheel (e.g. polished metal). In that case, the source of excitation light and the light integrating unit 18 will be on the same side of the wheel, the excitation light will impinge directly on the photoluminescent e.g. fluorescent or phosphorescent material and the fraction of excitation light that did not interact with the phosphor material will be reflected by the polished metal and be allowed to interact with the photoluminescent e.g. fluorescent or phosphorescent material on its way out. At the same time, the photoluminescent, e.g. fluorescent or phosphorescent light, emitted by the wavelength conversion material in the direction opposite the input of the light integrating unit 18 will be reflected by the polished metal and be reflected in the general direction of the input of the light integrating unit, thereby contributing to increase the efficiency of the light source unit 1.

Figure 3:
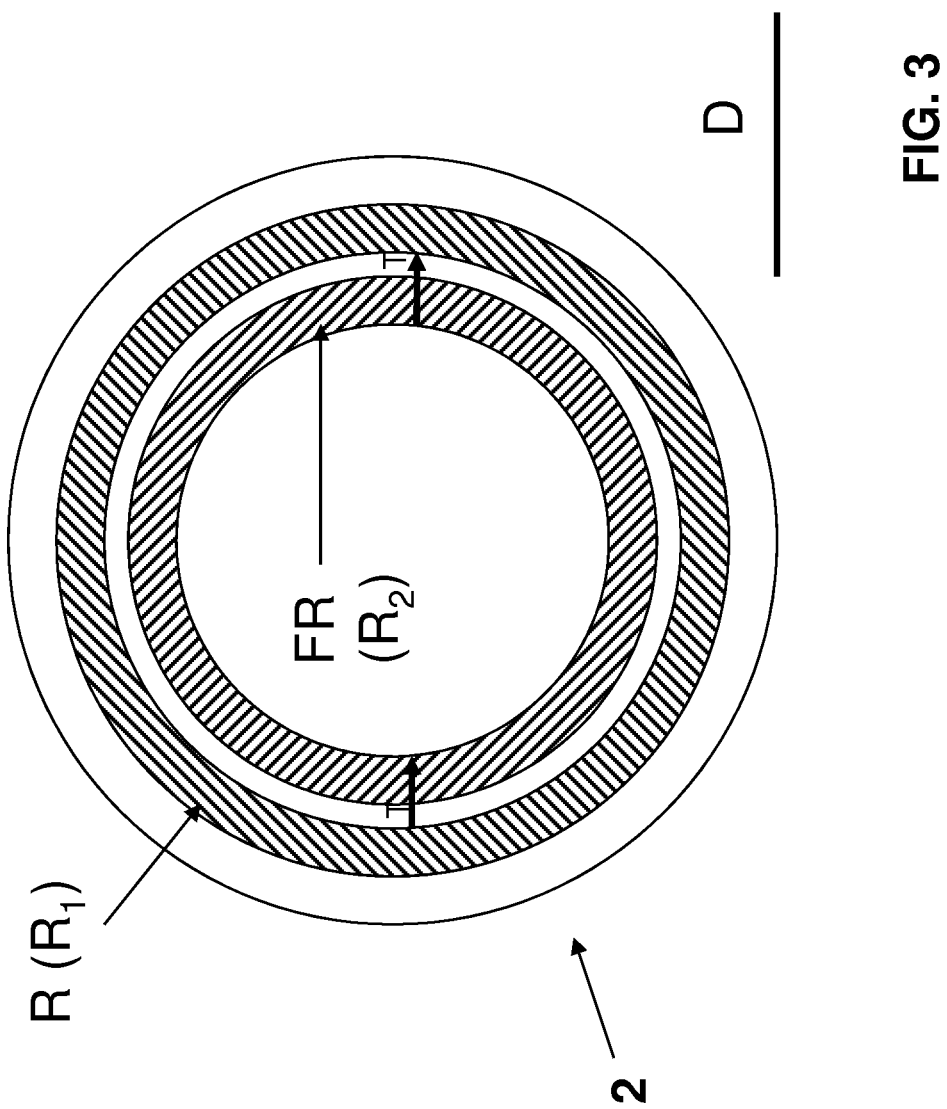
FIG. 3 illustrates where the light impinges on a fluorescent wheel as seen within the plane of a wheel according to a preferred embodiment of the present invention.

According to an embodiment of the present invention, when deterioration of the phosphor material in the region that has been excited by the excitation light is detected or expected, the region of the photoluminescent e.g. fluorescent or phosphorescent wheel where the excitation light will impinge may be varied by displacing the wheel along the direction D. For instance, if the second actuator makes use of a stepper motor and a lead screw, a known number of steps will result in a known lateral displacement of the wheel (along direction D) and the laser spot will move along a "fresh" region FR of the wavelength conversion material where its properties have not yet changed as in region R. To reach the fresh region and leave the region R where the wavelength conversion material is degraded, the amplitude of the translation T is at least as large as the width W of the region R. As illustrated in FIG. 3 the region FR has a smaller average radius than a region R.

In another embodiment according to the present invention the degradation of the properties of the wavelength conversion material can be postponed by regularly shifting the position of the region upon which the excitation light impinges. This can be done for instance by moving the wheel back and forth in discrete steps along direction D in order for the laser spot to scan different regions of the wheel. The excitation light can scan a given region Ri (i=1, 2, . . . ) for a given time Ti or for a given number of rotations of the wheel before moving to the next region. If only two such regions R are considered, as illustrated in FIG. 3, the excitation light will scan the outer ring R for at least one turn, the rotation wheel will then be translated until the excitation light impinges on the inner ring FR. The excitation light preferably will scan the inner ring FR for at least one turn before the wheel is translated back to its original position where the excitation light will scan the outer ring and so forth. In other embodiments of the present invention switching is possible between the different regions Ri at regular time intervals that are much shorter then the lifetime of the phosphor material to deteriorate the different regions uniformly. Alternatively the different regions could be used as a reserve tank, and moving to the next region is only decided if the current region has reached the end of its lifetime.

Figure 4:
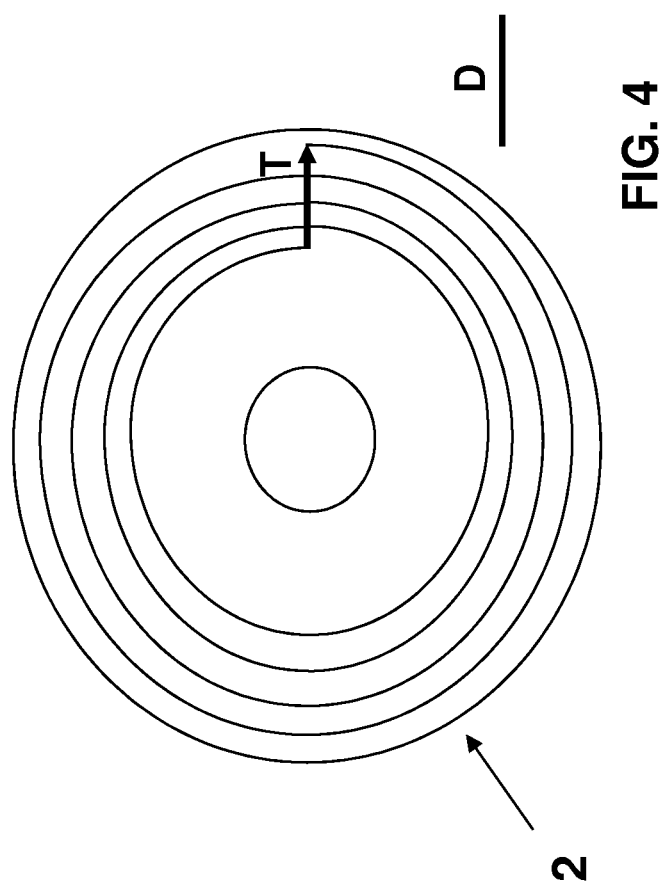
FIG. 4 illustrates where the light impinges on moving wheel with the frequency of the back and forth translational movement smaller than the frequency of the rotational movement according to an embodiment of the present invention.

According to another embodiment of the present invention the lateral displacement may be continuous: if the frequency of the back and forth translation of the wheel is smaller than the frequency at which the wheel rotates, the locus of the points where the excitation light will impinge on the fluorescent wheel can follow a spiraling-in and spiraling out pattern. This is illustrated in FIG. 4 where for the sake of clarity only the center of the spot (e.g. the projection of point 19 onto the wavelength conversion region) has been represented.

Although a spiral has been disclosed more complex movements are included within the scope of the present invention. Heat generated by the excitation beam in the photoluminescent material can spread laterally. Thus it can be of advantage if the excitation light beam does not return to a spot adjacent to a currently irradiated spot in a short time. Thus the relative motion between the wavelength conversion element and the excitation light beam can be in a series of steps like a Hilbert walk or Peano curve and generally the motion can be any suitable space filling curve. The movements can also be rotating motions such as a main rotation of a wavelength conversion element such as a color wheel about a central axis and a rotational processing of the axis of rotation to produce cycloidal, such as trochoidal, hypocycloidal, epicycloidal, hypotrochoidal, epitrochoidal motions.

Advantageously, this embodiment enables to limit the local temperature increase. In order to further limit the local temperature increase, the period of the lateral movement is chosen such that it is longer than the period of rotation of the wheel and preferably larger then 5 times the thermal time constant of an element of phosphor on the wheel 2. Preferably the translation period also is sufficiently short to make sure that the amount of translation during one period is large enough to avoid overlap with the trajectory of the previous rotation.

Figure 5:
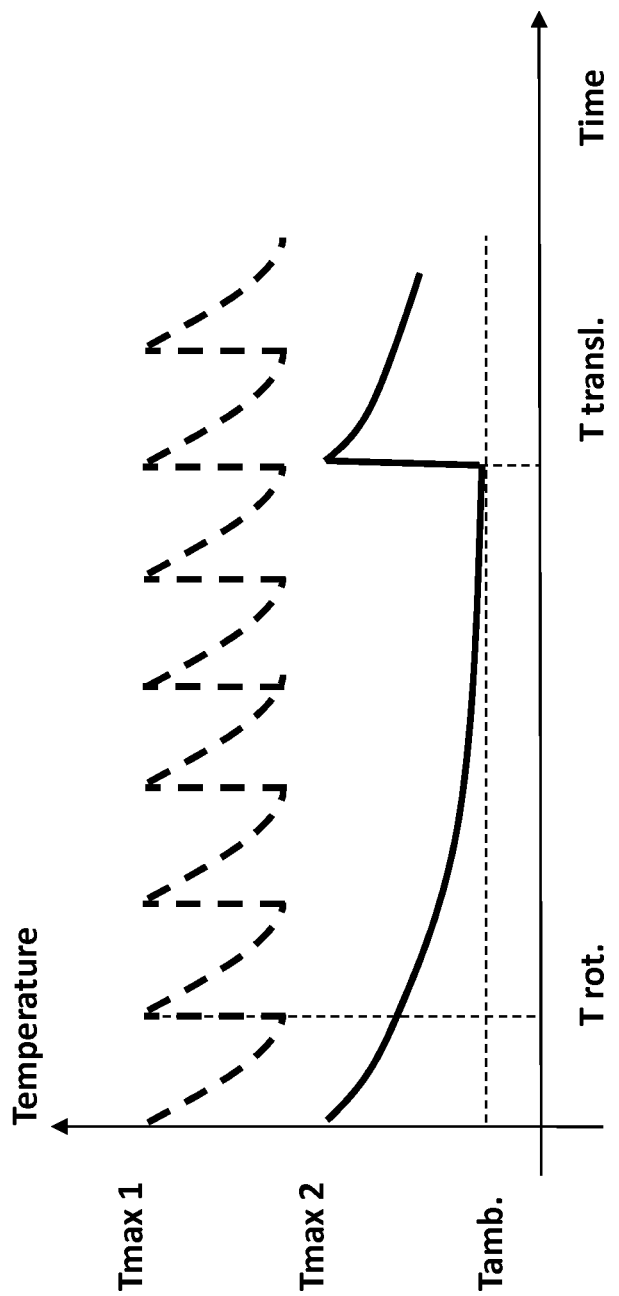
FIG. 5 illustrates how the temperature evolves in a phosphor element at a certain position on a wheel with only a rotational movement versus a wheel with an orbiting movement according to an embodiment of the present invention.

In FIG. 5 the dotted line indicates how the temperature evolves in a phosphor element at a certain position on the wheel with a rotational movement only. As soon as the laser hits the phosphor temperature rises immediately. Because of the poor thermal conductivity it cools down very slowly and is not able to cool down to ambient temperature before the rotation period is completed. In regime, the phosphor element reaches a maximum temperature Tmax1. If the rotational movement is combined with a lateral movement, which period is selected such that the phosphor is able to cool down completely before the laser hits the same position, the maximum temperature is reduced to Tmax2. This is indicated by the solid line in FIG. 5. Note: for reasons of simplicity the translation period is presumed to be an even multiple of the rotation period such that the laser returns to exactly the same position after the translation period. This is not a requirement and in fact it would be preferred to have a more irregular relationship to avoid that the positions of the orbits and the positions of the crossovers between spiraling in and out change over time. In another embodiment the local temperature increase can also be limited by further integrating a cooling unit in the light unit 1. An example of a cooling unit can be a nozzle which blows cold air on the area where a local temperature increase occurs.

Figure 6:
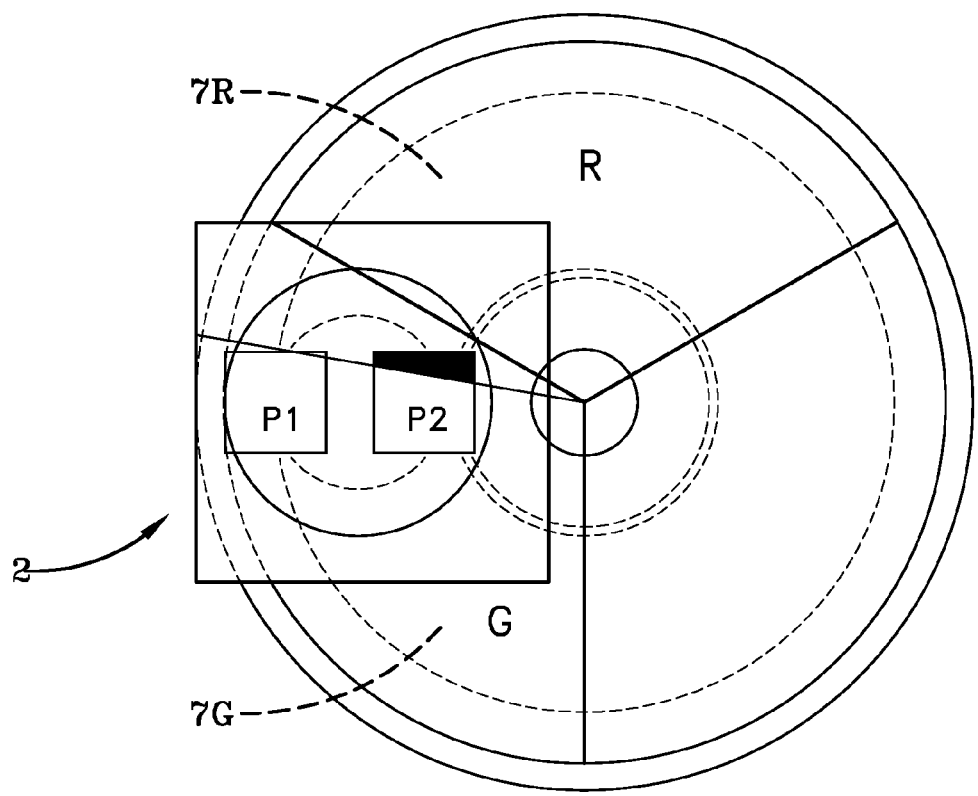
FIG. 6 shows a fluorescent wheel comprising different sectors with phosphors of different colors according to an embodiment of the present invention.
Figure 7:
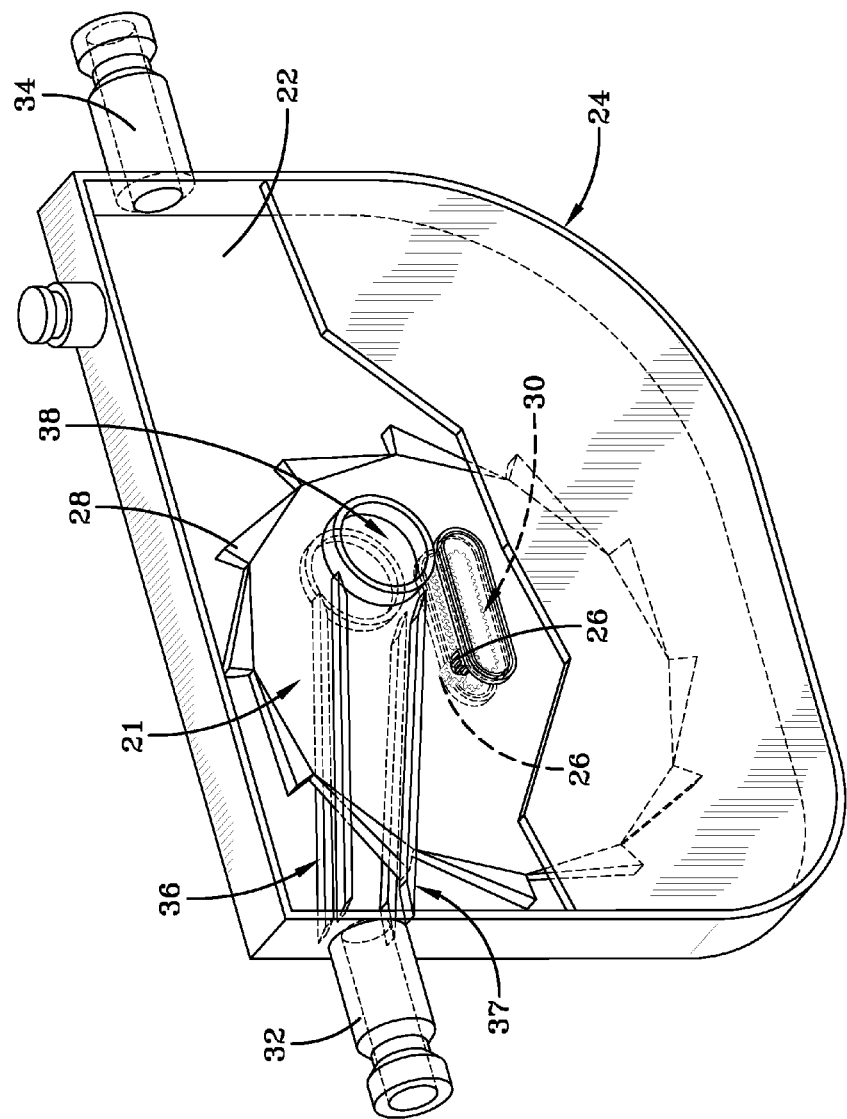
FIGS. 7 to 12 show a further embodiment in which the wavelength conversion element is immersed in a liquid and movement of the liquid is used to cool the wavelength conversion element.
Figure 8:
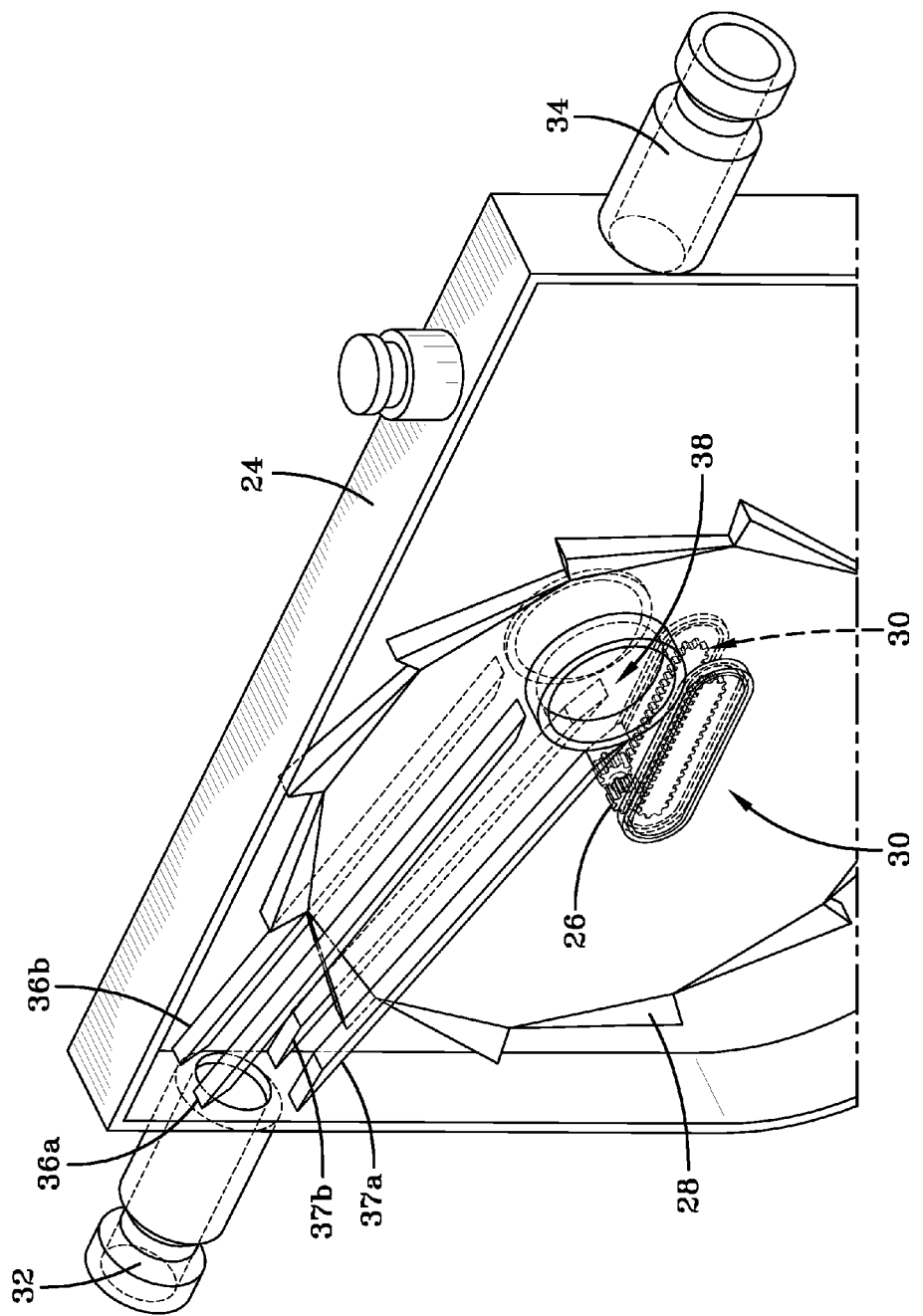
Figure 9:
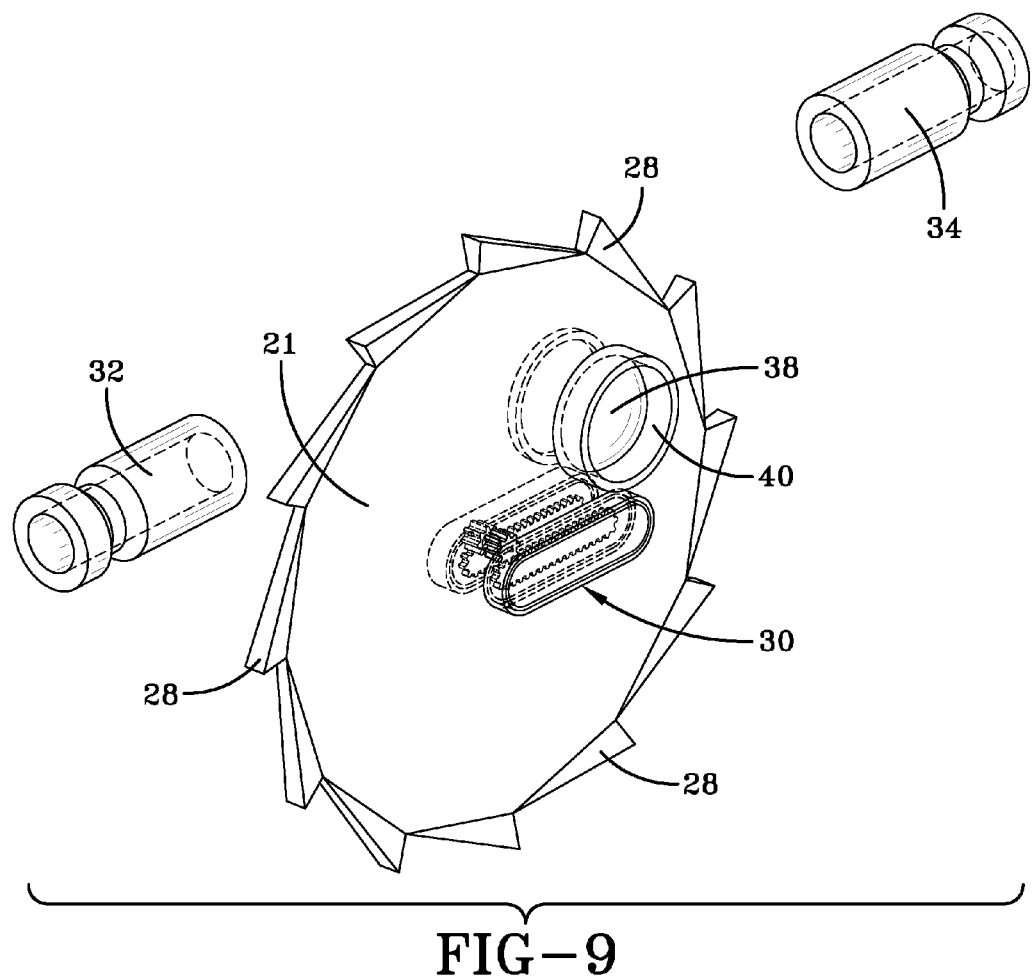
Figure 10:
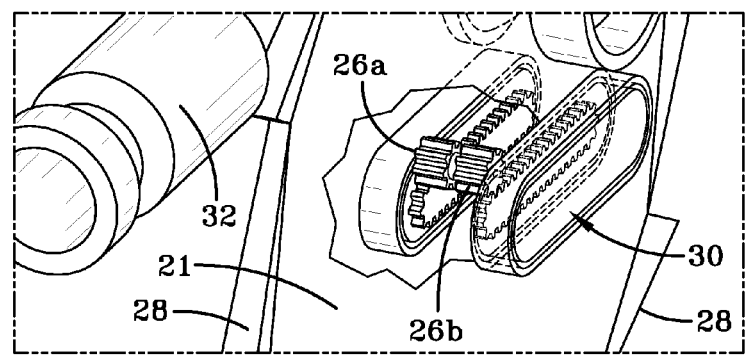
Figure 11:
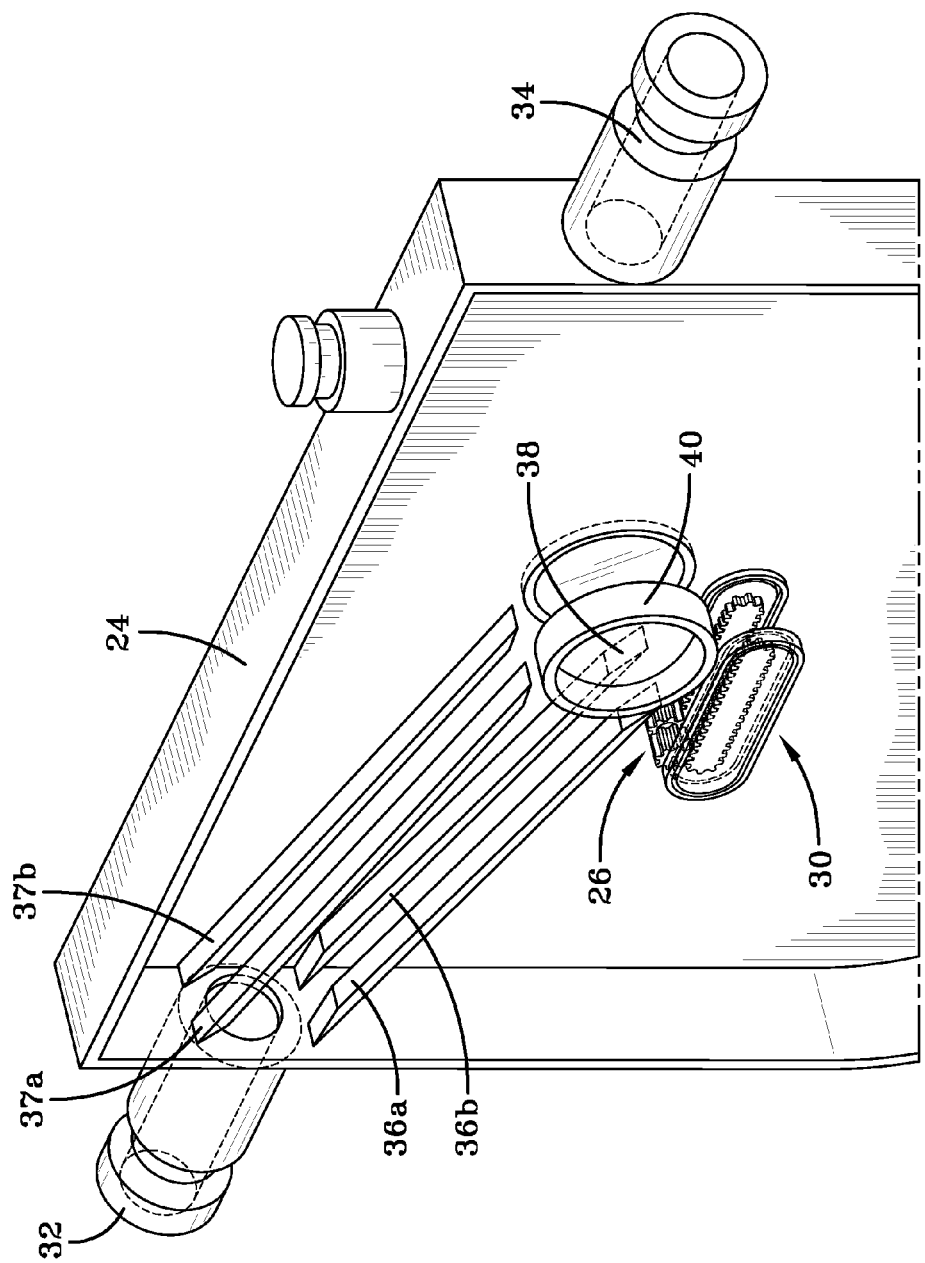
Figure 12:
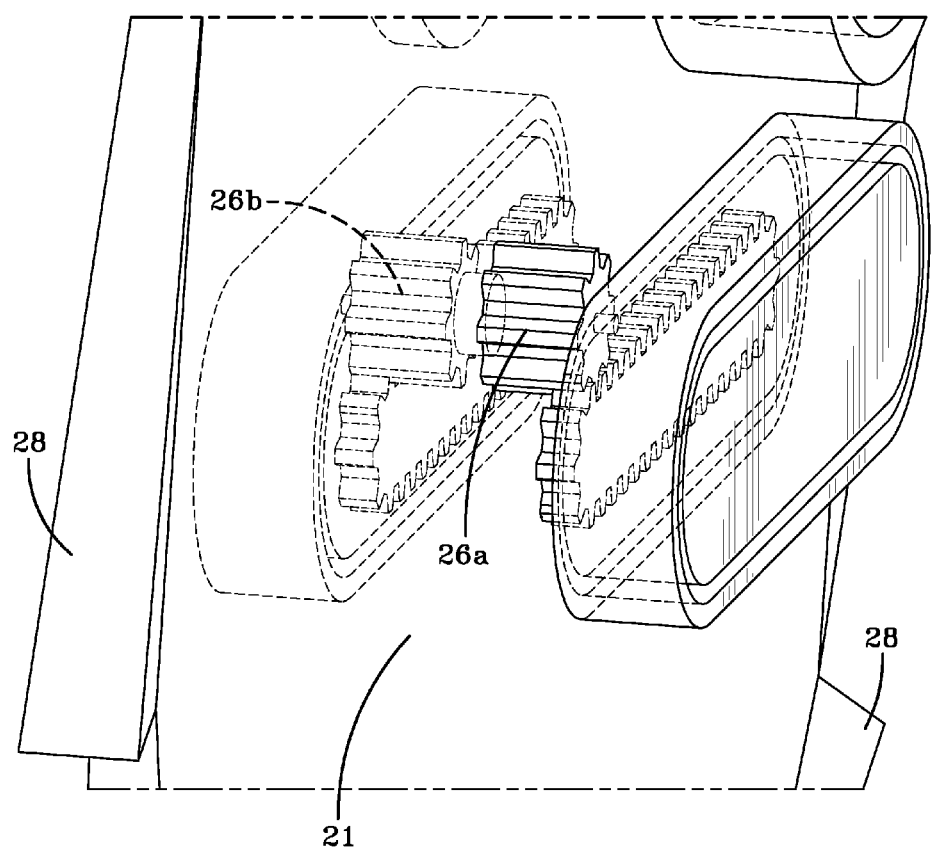

In other embodiments, an illumination device can comprise a photoluminescent wheel comprising different sectors with different phosphors. Preferably, at least one sector of the different sectors may additional be translucent for the excitation light. When the fluorescent wheel comprises different sectors with phosphors of different colors as figured on FIG. 6, one must take precautions to guarantee that the color of the light emitted by the light source unit 1 will correspond to or be in synch or be enabled to be synchronized with the data with which the light valve is programmed at the time the light of said color impinges on the light valve.

Indeed, due to the finite size of the spot or footprint that the excitation light leaves on the wavelength conversion material such as phosphor, synchronization is affected by the position of said spot or footprint along a radius of the wheel. This can be readily seen on FIG. 6 that compares the relative position of the spot with respect to the frontier between two phosphor regions with different colors. One sees that for the same angular position of the wheel, the spot will cross at a given instant in time that border or not depending on its position along a radius of the wheel.

While the center of the spots at position P1 and P2 have the same angular coordinate on the wheel, the spot at position P2 positioned closer to the center of the wheel already overlaps the red phosphor 7R. In position P2 both green light from phosphor region 7G and red light from phosphor region 7R is entering the integrator 18 and both colors illuminate the DLP at the same time. To mitigate this problem, (1) one may either limit the ratio between the size of the spot and the radius of the wheel or (2) one may add a feedback loop that will regulate the synchronization with the driving of the light valve.

A typical spot size required to illuminate a 0.9 inch DLP™ chip (the size of the micromirror array) will be 3 mm by 1.5 mm. With a wheel 2 with a diameter of 100 mm, one will be able to scan the wheel from its rim to a radius of 25 mm without having to suffer too much from the synchronization problem. In other words by limiting the amplitude of the translation T to a fraction of the radius of the wheel 2, one will mitigate the synch problem that might arise.

In yet another embodiment a reserve can be further integrated in the light source unit 1. Preferably the reserve may comprise photoluminescent e.g. fluorescent or phosphorescent material such as phosphorous material and is mounted in a position on the wheel or in the vicinity of the wheel 2. The reserve can be left unused in normal operation but can be used when other photoluminescent e.g. fluorescent or phosphorescent elements on the wheel have reached the end of their lifetime. The reserve can be a ring of material for instance placed in one position of the wheel, e.g. an outer ring. The end of the lifetime of a photoluminescent e.g. fluorescent or phosphorescent element on the wheel 2 can preferably be determined by an intensity sensor, for instance which detects when the intensity emitted by the photoluminescent e.g. fluorescent or phosphorescent element drops below a certain value.

To deliver high quality images it is important that short term fluctuations of the brightness are avoided. Further if a color wheel with different phosphor materials is used for the different primary colors or if different light sources are used for the different colors or even when several color wheels with different phosphor materials are used for different colors, whereby each color wheel comprises a light source, it is important that the white point balance is maintained even if the phosphors of different colors deteriorate differently over time, showing differential aging.

It is therefore preferred to combine the above embodiments with a closed loop feedback system. To achieve this, the output of a sensor for the white point, or of sensors of primary colors is compared with a reference value or set point and the intensity of a excitation light source such as a laser is altered in order to restore the white point. The sensors may measure the intensity of the light for each primary color. The power of the excitation light source is increased in those sectors where the light output from the wavelength conversion material is most degraded. Alternatively if the excitation light source has reached its maximum power for the production of a certain color, the power at the other colors can be reduced to maintain the desired white balance.

In some embodiments, an intensity sensor can be integrated with the light source or further downstream in the projector to detect the intensity.

Further, the power of the excitation light source 4 can be modulated to compensate for short term fluctuations and keep the light output constant at the desired level.

In a further embodiment as shown in FIGS. 7 to 12, which can be used with any of the previous embodiments mentioned, in order to cool the illuminated wavelength conversion element such as a color wheel e.g. with phosphor layer, more efficiently, a better thermal interfacing to the actual wavelength conversion element such as a color wheel, e.g. with phosphor is provided. This is executed in a way that the wavelength conversion element such as a color wheel, e.g. with phosphor allows the highest light energy concentration from the excitation light with an "as small as possible light-spot" for the pumping and the output light capturing.

In this embodiment in order to increase the efficiency of the heat transfer, the wavelength conversion element 21 such as a color wheel, e.g. with phosphor is submerged in a liquid medium 22 in an enclosure 24 that can form a closed cavity. The liquid medium 22 preferably flows, e.g. is pumped over the surface of the wavelength conversion element 21 such as a color wheel, e.g. with phosphor and cooled in an efficient way.

Such a liquid medium 22 can be a neutral silicone solution, for example with low (pumpable) viscosity and a fixed refractive index. Liquid materials should preferably self-de-aerate. If air bubbles become entrapped in the fluid, the liquid should self-de-aerate so that no pockets of air are trapped between mechanical or optical parts. Accelerated de-aeration can be obtained by vacuum de-aerating using a vacuum pump such as to provide a vacuum pressure of approximately 635 mm of Hg (25 inches of Hg), or greater. The presence of bubble formation can be avoided by increasing vacuum slowly to avoid rapid foaming.

Suitable liquid materials should be optically transparent, inert with preferably no intrinsic shelf life limitations and compatible with most optical glasses, and semiconductors, for example. Such liquids should have a high purity composition with low ionics (e.g. ionics K, Na, P, Ag, Cu, Sn<10 ppm, each) to ensure no degradation of sensitive semiconductors and metals. Service temperature range should be for example between −40° C. and +150° C., hence requiring a boiling point above these values. The refractive index should allow index matching to plastic, glass, semiconductor materials. The liquids should be low viscosity fluids that allow pumping in circulation. Liquid materials should be non-toxic, optically clear with efficient optical transmission for wavelengths used in projectors, e.g. in the visible range, have high surface tension to form non-migrating in thin-films, and have low volatility to avoid re-condensation. Optical transmission should be good i.e. close to 100% such as >90%, >95% or >99% transmission in the range 200 to 1000 nm, e.g. above 200 nm and less than 800 nm and an index of refraction in the range 1.2-1.7, e.g. 1.3 close to that of most optical grade glasses.

Liquid materials that can be considered suitable are those from Santolubes such as Santolight materials whose properties are shown in Table 1 below and described in: http://www.santolubes.com/resources/tds-msds/TDS-SANTO-LIGHT-SL-5262.pdf:

| TYPICAL PHYSICAL AND PERFORMANCE PROPERTIES | | |
| --- | --- | --- |
| Property (at 25° C. unless noted) | Test Method | Typical Value |
| Mechanical Properties | | |
| Viscosity | ASTM D 1084 | 650 cP |
| Specific Gravity | ASTM D 1217 | 1.18 |
| Thermal Properties | | |
| Glass Transition | TMA/DSC | −30° C. (Estimate) |
| Pour Point | ASTM D 97 | −10° C. |
| Thermal Expansion by Volume | ASTM D 1903 | $5.3 \times 10^{-4}$ cc/cc/° C. |
| Thermal Conductivity | ASTM C 177 | 0.13 Watt/(meter-° C.) |
| Evaporation Rate (24 hrs, 100° C.) | ASTM D 972 | 0.1%, est. |
| TGA Take-off, 1% mass loss | TGA | 200° C., est. |
| Electro-optical Properties | | |
| Appearance | Visual | Crystal clear, yellow tint |
| Ionics (K, Na, P, Ag, Cu, Sn) | ICP | <10 ppm, each, est. |
| Volume Resistivity | ASTM D 257 | $>10^{15}$ ohm-cm, est. |
| Refractive Index, 589 nm | ASTM D 1218 | 1.62 |
| Refractive Index vs. Temp., 589 nm | ASTM D 1218 | $-4.2 \times 10^{-4}$/° C. |
| Refractive Index vs. Wavelength | Prism coupler | (See chart) |
| Optical Absorption | Spectrophotometer | (See chart) |
| Particle Contamination | MIL-STD-1246C | Level 25, est. |

Also the transparent inert cooling fluids from 3M (e.g. Novec and Fluoroinert), preferably with boiling point>130 degrees C. can be useful, see Table 2 taken from the document mentioned below:

| 3M ™ Novec ™ Engineered Fluids | | | | | | | |
| --- | --- | --- | --- | --- | --- | --- | --- |
| | Unit | Novec 7000 | Novec 7100 | Novec 7200 | Novec 7300 | Novec 7500 | Novec 7600 |
| Boiling Point | ° C. | 34 | 61 | 76 | 98 | 128 | 131 |
| Pour Point | ° C. | −122 | −135 | −138 | −38 | −100 | −98 |
| Molecular Weight | g/mol | 200 | 250 | 264 | 350 | 414 | 346 |

| 3M ™ Novec ™ Engineered Fluids | | | | | | | |
|---|---|---|---|---|---|---|---|
| | Unit | Novec 7000 | Novec 7100 | Novec 7200 | Novec 7300 | Novec 7500 | Novec 7600 |
| Critical Temperature | ° C. | 165 | 195 | 210 | 243 | 261 | 260 |
| Critical Pressure | MPa | 2.48 | 2.23 | 2.01 | 1.88 | 1.55 | 1.67 |
| Vapor Pressure | kPa | 65 | 27 | 16 | 5.9 | 2.1 | 0.96 |
| Heat of Vaporization | kJ/kg | 142 | 112 | 119 | 102 | 89 | 116 |
| Liquid Density | kg/m$^3$ | 1400 | 1510 | 1420 | 1660 | 1614 | 1540 |
| Coefficient of Expansion | K$^{-1}$ | 0.0022 | 0.0018 | 0.0016 | 0.0013 | 0.0013 | 0.0011 |
| Kinematic Viscosity | cSt | 0.32 | 0.38 | 0.41 | 0.71 | 0.77 | 1.1 |
| Absolute Viscosity | cP | 0.45 | 0.58 | 0.58 | 1.18 | 1.24 | 1.65 |
| Specific Heat | J/kg-K | 1300 | 1183 | 1220 | 1140 | 1128 | 1319 |
| Thermal Conductivity | W/m-K | 0.075 | 0.069 | 0.068 | 0.063 | 0.065 | 0.071 |
| Surface Tension | mN/m | 12.4 | 13.6 | 13.6 | 15.0 | 16.2 | 17.7 |
| Solubility of Water in Fluid | ppm by weight | −60 | 95 | 92 | 67 | 45 | 410 |
| Solubility of Fluid in Water | ppm by weight | <50 | 12 | <20 | <1 | <3 | <10 |
| Dielectric Strength, 0.1" gap | kV | −40 | −40 | −40 | −40 | −40 | −40 |
| Dielectric Constant @ 1 kHz | — | 7.4 | 7.4 | 7.3 | 6.1 | 5.8 | 6.4 |
| Volume Resistivity | Ohm-cm | $10^8$ | $10^8$ | $10^8$ | $10^{11}$ | $10^8$ | $10^{10}$ |
| Global Warming Potential | GWP | 420 | 297 | 59 | 210 | 100 | 700 |

For test methods and variability, contact 3M Technical Service

| 3M ™ Fluorinert ™ Electronic Liquids | | | | | | | | |
|---|---|---|---|---|---|---|---|---|
| | Unit | FC-3284 | FC-72 | FC-84 | FC-770 | FC-3283 | FC-40 | FC-43 |
| Boiling Point | ° C. | 50 | 56 | 80 | 95 | 128 | 155 | 174 |
| Pour Point | ° C. | −73 | −90 | −95 | −127 | −50 | −57 | −50 |
| Molecular Weight | g/mol | 299 | 338 | 388 | 399 | 521 | 650 | 670 |
| Critical Temperature | ° C. | 161 | 176 | 202 | 238 | 235 | 270 | 294 |
| Critical Pressure | MPa | 1.94 | 1.83 | 1.75 | 2.47 | 1.22 | 1.18 | 1.13 |
| Vapor Pressure | kPa | 35 | 30 | 11 | 6.6 | 1.4 | 0.43 | 0.19 |
| Heat of Vaporization | kJ/kg | 105 | 88 | 90 | 86 | 78 | 68 | 70 |
| Liquid Density | kg/m$^3$ | 1710 | 1680 | 1730 | 1793 | 1820 | 1850 | 1860 |
| Coefficient of Expansion | K$^{-1}$ | 0.0016 | 0.0016 | 0.0015 | 0.0015 | 0.0014 | 0.0012 | 0.0012 |
| Kinematic Viscosity | cSt | 0.42 | 0.38 | 0.53 | 0.79 | 0.75 | 1.8 | 2.5 |
| Absolute Viscosity | cP | 0.71 | 0.64 | 0.91 | 1.4 | 1.4 | 3.4 | 4.7 |
| Specific Heat | J/kg-K | 1100 | 1100 | 1100 | 1038 | 1100 | 1100 | 1100 |
| Thermal Conductivity | W/m-K | 0.062 | 0.057 | 0.060 | 0.063 | 0.066 | 0.065 | 0.065 |
| Surface Tension | mN/m | 13 | 10 | 12 | 15 | 15 | 16 | 16 |
| Solubility of Water in Fluid | ppm by weight | 14 | 10 | 11 | 14 | 7 | <7 | 7 |
| Solubility of Fluid in Water | ppm by weight | <5 | <5 | <5 | <5 | <5 | <5 | <5 |
| Dielectric Strength, 0.1" gap | kV | >40 | >40 | >40 | >40 | >40 | >40 | >40 |
| Dielectric Constant @ 1 kHz | — | 1.9 | 1.8 | 1.8 | 1.9 | 1.9 | 1.9 | 1.9 |
| Volume Resistivity | Ohm-cm | $10^{15}$ | $10^{15}$ | $10^{15}$ | $10^{15}$ | $10^{15}$ | $10^{15}$ | $10^{15}$ |

Table 2 is taken from: http://multimedia.3m.com/mws/mediawebserver?mwsId=sssss72sFWtTz8UuoY9zpY_sFWuRFWtsFWtsFWtsFssssss--&fn=bro_heattrans.pdf.

Suitable liquid materials may also be found among those liquids researched for immersion lithography as these are able to withstand laser light for long periods. Lower refractive index liquids compared to those used for lithography may be preferred. In addition to water, second generation (GEN2) and third generation (GEN3) lithographic immersion fluids can be considered such as described, for example in "High Index Immersion Lithography With Second Generation Immersion Fluids To Enable Numerical Apertures of 1.55 For Cost Effective 32 nm Half Pitches". R. H. French, V. Liberman, H. V. Tran, J. Feldman, D. J. Adelman, R. C. Wheland, W. Qiul, S. J. McLainl, O. Nagao, M. Kaku, M. Mocella, M. K. Yang, M. F. Lemon, Proc. of SPIE Vol. 6520 65201O-3. The refractive index of such materials used for photolithography can be well tuned to the wavelength conversion element 21 such as phosphor as the relevant wavelength range is 200 to 800 nm at which wavelengths the refractive index is typically lower and in the range 1.2 to 1.7, typically 1.3 to 1.6.

Preferably cooling fluids should be selected for their high or higher thermal conductivity to enhance heat spreading as well as their radiation durability.

The wavelength conversion material such as phosphor is fixed on the surface of a transparent wheel 21. The wheel 21 is preferably suspended on the gear 30 with gear elements 26 which allow rotation of the wheel and also more complex motions. In an embodiment the immersion liquid is also used to drive the wheel. For example, the wheel preferably also has fins 28. These can be mounted at its outer rim for example. The fins 28 are pushed by a pumped liquid stream as in a Peltier wheel arrangement. Flow guides 36 (36a, 36b) and 37 (37a, 37b) can be provided on either side of the wheel to direct pumped liquid to the laser spot position 38. Accordingly, the system has a means for causing the liquid to flow such as a pump (not shown) for the liquid. Further a reservoir can be provided for the liquid as well as an inlet nozzles 32, and an outlet nozzle 34. A loop of conduit or tubing can be provided to return the liquid to the inlet nozzle 32. In this way the wheel 21 is propelled into a rotation. A plurality of nozzles can be used to produce different flows, e.g. to the fins 28 and/or to the laser spot position 38. Other means of rotation can be used such as an electric motor and the cooling flow can be regulated separately from the rotational motion. The rotational movement (however it is generated) preferably engages the gear 30 which is setup to move the wheel in an orbital way. The gear 30 includes elements 26a and 26b such as a gear cog 26a and an endless geared track 26b which move the centre of rotation in a linear reciprocal motion at the same time as the rotation of the wheel. The rotating motions can be a main rotation of a wavelength conversion element such as a color wheel about a central axis and a rotational processing of the axis of rotation to produce cycloidal, such as trochoidal, hypocycloidal, epicycloidal, hypotrochoidal, epitrochoidal motions. The gear is hence a means for a rotational processing of the axis of rotation to produce cycloidal, such as trochoidal, hypocycloidal, epicycloidal, hypotrochoidal, epitrochoidal motions.

The latter motion or motions allow(s) for spreading the energy injected into the pumping spot over a larger surface of the wheel. At the same time the surface is also cooled by the liquid stream, which is circulating in the enclosure 24. Elements like the wheel, lenses 40 and the gear 30 can be mounted in the closed cavity.

Lenses 40 or other optical devices can be placed at both sides of the wheel, which take care that the wavelength conversion pumping light focus and the output light capturing are both in a fixed position.

The liquid is pumped around the loop of conduit or tubing and can be cooled by conventional cooling provisions like radiator heat-exchangers supported by a chilled system like thermo-electric cooling elements.

It is to be understood that this invention is not limited to the particular features of the means and/or the process steps of the methods described as such means and methods may vary. It is also to be understood that the terminology used herein is for purposes of describing particular embodiments only, and is not intended to be limiting. It is also to be understood that plural forms include singular and/or plural referents unless the context clearly dictates otherwise. It is moreover to be understood that, in case parameter ranges are given which are delimited by numeric values, the ranges are deemed to include these limitation values.

The invention claimed is:

1. An illumination device comprising a light source for generating an excitation light and a wavelength conversion element, said wavelength conversion element comprising: a region containing a wavelength conversion material capable of absorbing the excitation light of said light source and emitting light having wavelengths different from that of the excitation light; and wherein the wavelength conversion element and the excitation light source are moveable relative to each other so that said region is exposed to the excitation light at different times and in a progressive relative movement that scans across a two-dimensional surface of the wavelength conversion element, wherein the relative movement of the wavelength conversion element and the excitation light source is achieved by combining rotational and translational movements such that a region of the wavelength conversion element is scanned by light from the excitation light source.

2. The illumination device of claim 1, further comprising a dichroic element disposed between the wavelength conversion material and the light source, the dichroic element transmitting the excitation light and reflecting light emitted by the wavelength conversion material.

3. The illumination device of claim 1, further comprising a reflecting material disposed in the back of the wavelength conversion material, the reflecting material reflecting unconverted excitation light and light emitted by the wavelength conversion material.

4. The illumination device of claim 1, wherein two actuators are used to move said wavelength conversion element; a first actuator is used to rotate said wavelength conversion element and a second actuator is used to translate said wavelength conversion element in a direction with a component parallel to the plane of said wavelength conversion element.

5. The illumination device of claim 4, wherein the frequency of the translational movement is smaller than the frequency of rotational movement resulting in a spiraling pattern.

6. The illumination device of claim 1, wherein said wavelength conversion element comprises a material that photoluminesces to produce at least one primary colored light when illuminated with said light from said light source.

7. The illumination device of claim 6, wherein when the material that photoluminesces is degraded after illumination by said light from said excitation light source, the excitation beam is moved to a fresh region, different from the material that photoluminesces which has been degraded after illumination, comprising a material which photoluminesce which have not been illuminated.

8. The illumination device of claim 1, wherein switching is possible between the different regions or sectors at regular time intervals that are much shorter than the lifetime of the wavelength conversion materials so that the wavelength conversion materials of different regions or sectors degrade uniformly.

9. The illumination device of claim 1 further comprising a reserve of unused wavelength conversion material.

10. The illumination device of claim 1 further comprising a sensor for determining the lifetime of the wavelength conversion element.

11. The illumination device of claim 1, wherein the wavelength conversion element is immersed in a liquid.

12. The illumination device of claim 11 further comprising a pump for pumping the liquid to cool the wavelength conversion element.

13. The illumination device of claim 11 wherein the wavelength conversion element has fins for rotation by the pumped liquid.

14. The illumination device of claim 13 further comprising gears for converting the rotation of the wavelength conversion element into relative motion between the excitation light source and the wavelength conversion element so that said region is exposed to the excitation light at different times and in a progressive relative movement that scans across a two-dimensional surface of the wavelength conversion element.

15. An illumination device comprising a light source for generating an excitation light and a wavelength conversion element, said wavelength conversion element comprising: a region containing a wavelength conversion material capable of absorbing the excitation light of said light source and emitting light having wavelengths different from that of the excitation light; and wherein the wavelength conversion element and the excitation light source are moveable relative to each other so that said region is exposed to the excitation light at different times and in a progressive relative movement that scans across a two-dimensional surface of the wavelength conversion element, and wherein the wavelength conversion element is immersed in a liquid and wherein the illumination device further comprises a pump for pumping the liquid to cool the wavelength conversion element.

16. An illumination device comprising a light source for generating an excitation light and a wavelength conversion element, said wavelength conversion element comprising: a region containing a wavelength conversion material capable of absorbing the excitation light of said light source and emitting light having wavelengths different from that of the excitation light; and wherein the wavelength conversion element and the excitation light source are moveable relative to each other so that said region is exposed to the excitation light at different times and in a progressive relative movement that scans across a two-dimensional surface of the wavelength conversion element, and wherein the wavelength conversion element is immersed in a liquid and wherein the illumination device further comprises a pump for pumping the liquid to cool the wavelength conversion element, wherein the wavelength conversion element has fins for rotation by the pumped liquid.

* * * * *